(No Model.)
I. KITSEE.
ELECTRODE FOR SECONDARY BATTERIES.
No. 443,455. Patented Dec. 23, 1890.
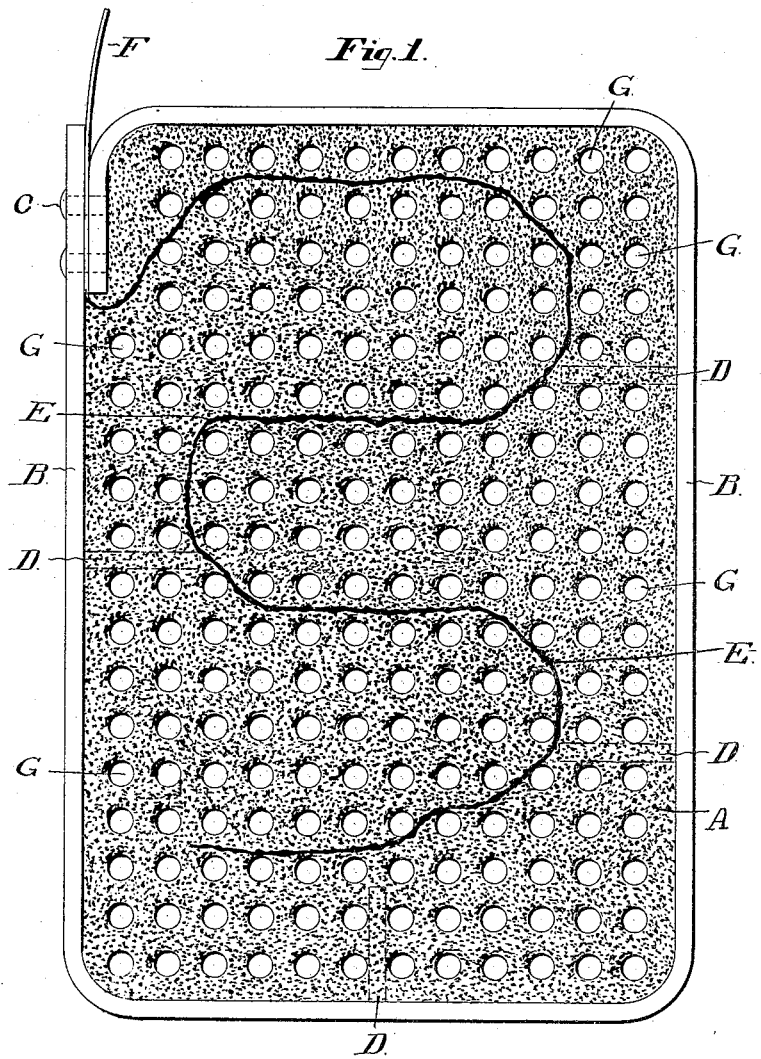

UNITED STATES PATENT OFFICE.

ISIDOR KITSEE, OF CINCINNATI, OHIO, ASSIGNOR TO MAYER SULZBERGER, TRUSTEE, OF PHILADELPHIA, PENNSYLVANIA.

ELECTRODE FOR SECONDARY BATTERIES.

SPECIFICATION forming part of Letters Patent No. 443,455, dated December 23, 1890.

Application filed February 11, 1890. Serial No. 340,042. (No model.)

*To all whom it may concern:*

Be it known that I, ISIDOR KITSEE, a citizen of the United States, residing at Cincinnati, county of Hamilton, in the State of Ohio, have invented certain new and useful Improvements in Secondary Batteries, of which the following is a specification.

As is well known, secondary batteries are generally formed of plates of lead provided with active material usually consisting of oxide of lead. In the use of secondary batteries of this description the plates or electrodes eventually become unduly brittle and warped, with the result that jarring occasions their disintegration and the final separation from their surfaces of the spongy red lead formed upon or applied to them. The buckling of the plates or electrodes causes the positive and negative plates of the battery to come into contact by which short circuits are established and the battery rendered useless. The separation of the active material from the plates of the electrodes increases the resistance of the battery by reason of the formation of a layer of sulphate of lead between the active material and the surface of the containing plate and occasions a consequent decrease of the electrical energy of the battery. In secondary batteries of the usual construction the plates employed are capable of containing but a certain limited amount of oxide of lead, and therefore, in batteries of this description, it has been found necessary to employ a great number of elements.

In Letters Patent of the United States No. 400,226, dated March 26, 1889, and No. 406,916, dated July 16, 1889 granted upon my application, are shown and described electrodes for a secondary battery consisting of supporting plates unsusceptible to electrolysis or to corrosive action and provided upon one or more of their surfaces with a layer of a suitable element substance.

My present invention is embodied in an electrode in which the active material is contained within a frame of rubber or of other material incapable of being acted upon by electricity or by the acid of the battery fluid or electrolyte.

In the drawings, Figure 1 is an elevational view of an electrode embodying my invention, and Fig. 2 a horizontal sectional view of the electrode shown in Fig. 1.

In the electrode shown in the drawings A is a mass or block of suitable active material, which is inclosed or contained in a frame B which consists of a strip or band of hard rubber or other material unsusceptible to the action of electricity or to the acid of the electrolyte the ends of which are riveted together at C or fastened together in any suitable manner. This frame is provided with hard rubber pins D which are attached to and spring from the inner sides of the frame B and which serve to hold the mass or block of active material in place therein. A conductor E formed of any suitable metal is embedded in the block A of the battery and terminates in a lug or pole F.

G G are holes or perforations in or through the active material to increase the surface area thereof exposed to the electrolyte.

An active material which may with advantage be used in a positive electrode embodying my invention may be made by mixing together red lead and powdered charcoal in the proportion, by volume, of fifty per cent. of each of said materials, and by mixing therewith a sufficient quantity of a mixture of water and acetic acid to properly moisten the mass to enable it to be bound together, and to, when dry, form a plate or block $v$. I have employed about one ounce of acetic acid to fifteen ounces of water, but these proportions as well as the proportions above named of red lead and charcoal, may be varied without departing from my invention. The active material described forms the subject of an application for Letters Patent, which application is of even date herewith Serial No. 340,043. This active material may, in a moist condition, be placed or packed directly within the containing frame shown in the drawings, or in any other containing frame, and around the conductor E, or in contact with any suitable conductor, and may, by any suitable device, be provided with holes or apertures G G, and may then be allowed to dry in its frame, or the active material, in a moist condition, may be molded or formed, in a mold corresponding in size and form to the frame within which it is to be contained and about a proper conductor, and be then, when dry, placed in its containing frame, or the active material, while moist may be formed or molded into blocks the dimensions and configuration of a given number of which, are such that they when placed side by side, will properly fill the containing frame in which the active material is to be employed, and may, when dry, be placed in said frame in contact, in any suitable manner, with a proper conductor.

Active material formed in blocks and provided with holes or perforations, as above described, form the subject of separate applications for Letters Patent made by me and bearing even date herewith. Serial Nos. 340,044 and 340,045.

In case the electrode herein referred to is to be used as the negative element or electrode of the battery the active material may consist of litharge and of about three per cent. by weight, of acetate of lead powder. The acetate of lead powder may be made by boiling acetate of lead in dilute sulphuric acid until it melts, and by then evaporating the mass until there is a residuum of dry acetate and sulphate of lead. This mixture of acetate and sulphate of lead is ground up and mixed with litharge, in a dry condition, and is then placed either in the frame of the electrode in which the active material is to be contained or in a proper mold, as has above been described in connection with the treatment of active material for the positive electrode.

It is to be understood that a containing frame of construction other than that hereinbefore described, and active material other than that hereinbefore referred to, may be employed without departing from the spirit of my invention.

Having thus described my invention, I claim—

1. In an electrode for a secondary battery, a frame formed of rubber or of other material unsusceptible to the action of electricity or to the acid of the electrolyte and containing active material, a conductor formed of any suitable metal and embedded in or placed in contact with said active material, the conductor, when in place between the ends of the piece of rubber, forming the frame, and said ends of the frame being bound together by rivets, substantially as set forth.

2. An electrode for a secondary battery, consisting of a containing frame formed of rubber or of other material unsusceptible to the action of electricity or to the acid of the electrolyte and provided upon its inner surface with points or projections, and containing active material, substantially as described.

In testimony that I claim the foregoing as my invention I have hereunto signed my name this 4th day of February, A. D. 1890.

ISIDOR KITSEE.

In presence of—
F. NORMAN DIXON,
LEWIS ALTMAIER.